Dec. 20, 1932.   W. H. WATROUS   1,891,631
APPARATUS FOR TESTING BRAKES
Filed Nov. 19, 1928   2 Sheets-Sheet 2
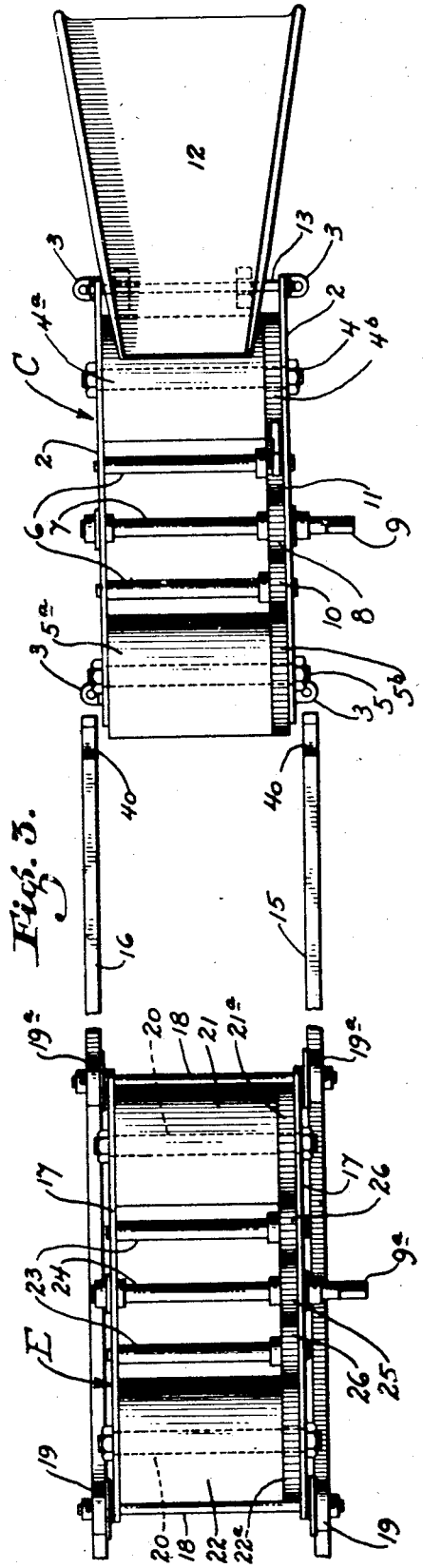
INVENTOR.
Willis H. Watrous.
BY Townsend Loftus & Abbett
ATTORNEYS.

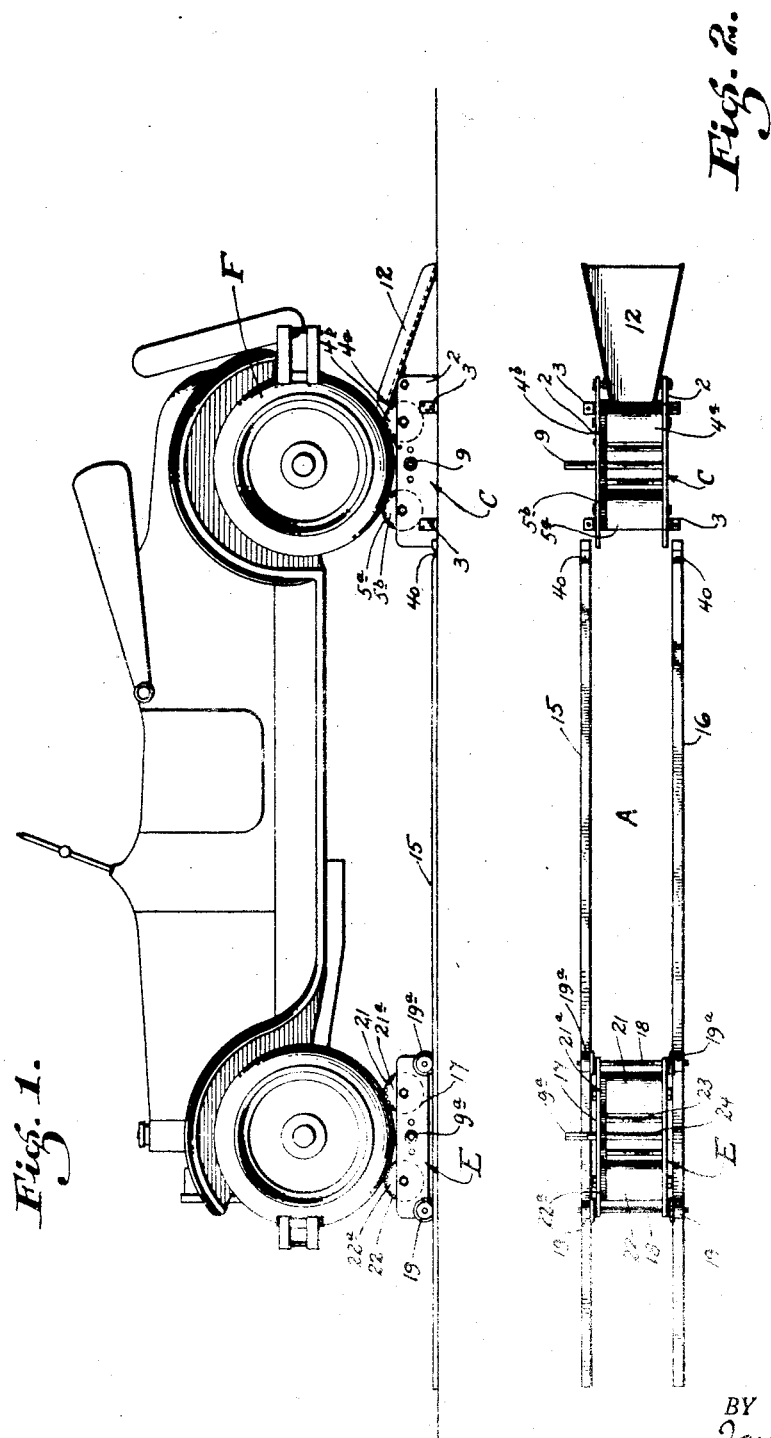

Patented Dec. 20, 1932

1,891,631

UNITED STATES PATENT OFFICE

WILLIS H. WATROUS, OF OAKLAND, CALIFORNIA

APPARATUS FOR TESTING BRAKES

Application filed November 19, 1928. Serial No. 320,295.

This invention relates to an apparatus for testing brakes, and especially to an apparatus whereby all four wheels may be supported so that the wheels may be rotated while the brakes are being adjusted and tested.

When adjusting or testing the brakes of a vehicle such as an automobile, whether it is equipped with two or four wheel brakes, it is essential that the brakes grip, or exert a uniform pressure when the brake pedal is depressed as the efficiency of the braking equipment and the life of the brake lining are materially reduced unless uniform pressure is applied by each brake.

In order that the brakes may be properly adjusted and tested, it is desirable that the vehicle be somewhat elevated so that the mechanic may have free, unobstructed access to the brakes. It is also desirable that the wheels should be free to rotate, and that means be provided for rotating the wheels in order that the resistance of the brakes when pressure is applied may be determined.

The apparatus for testing brakes shown in the present application provides these several features, the object being to generally improve and simplify the construction and operation of brake testing apparatus, to provide an apparatus whereby the automobile is supported in an elevated position while the brakes are being adjusted and tested, to provide an apparatus which permits support and rotation of the wheels, and furthermore to provide means whereby rotary movement may be transmitted to the wheels so that the resistance of the brakes when pressure is applied may be determined.

The brake testing apparatus is shown by way of illustration in the accompanying drawings, in which:

Fig. 1 is a side elevation of an automobile, showing it supported by the brake testing apparatus, Fig. 2 is a plan view of the brake testing apparatus, Fig. 3 is an enlarged plan view partially broken away, of one trackway and the trucks whereby the wheels are supported, Fig. 4 is a side elevation of the same, Fig. 5 is a side elevation of the brake testing lever.

Referring to the drawings in detail, and particularly to Fig. 2, A and B indicate a pair of trackways at one end of which is disposed a pair of stationary trucks, such as indicated at C, C. These stationary trucks are best illustrated in Figs. 3 and 4 and as they are identical in construction, the description of one will suffice. The truck shown in plan view in Fig. 3 and in side elevation in Fig. 4 consists of a pair of side plates 2, 2 which are secured to a concrete floor or the like by means of perforated lugs 3, through which bolts or the like are passed into anchor members in the concrete. Extending through the plates at opposite ends are bolts 4 and 5, and journalled thereon are rollers 4a and 5a. Also journalled on the bolts and secured to the ends of the respective rollers 4a and 5a are spur gears 4b and 5b. These gears may be cast integral with the rolls, or manufactured separately and later on secured to the ends of the rolls.

Also extending crosswise between the plates 2, 2 are three shafts, indicated at 6, 6 and 7. The shaft 7 is disposed centrally between the shafts 6, 6 and it carries a driving pinion 8 which is secured thereto. The shaft 7 is extended through the pinion 8, and side plate 2 and its outer end is squared as indicated at 9 to receive a testing lever generally indicated at D, see Fig. 5. Secured on the shafts 6, 6 and intermeshed with the gears 4b, 5b and 8 are a pair of intermediate gears 10 and 11.

When shaft 7 is rotated by the application of the testing lever indicated at D, rotary movement will be transmitted to the gear 8, the intermediate gears 10 and 11 and the gears 4b and 5b and as these are secured to the respective rolls 4a and 5a, the rolls will be rotated in unison and in the same direction, the direction of rotation of the several gears being indicated by the arrows in Fig. 4. The rolls 5a and 4a are intended first as a support for the rear wheels F of an automobile, see Fig. 1, and secondly as a means for rotating said wheels against the resistance of the brakes when they are applied and when they are being adjusted. Third, they serve as a means of supporting the automobile as a whole in a somewhat elevated position with relation to the floor or other support. In view of this elevated position it is necessary to provide a means for directing and guiding the wheels up to the rolls, the means shown in the present instance being the flanged apron or inclined plate 12, which is supported between the side plates 2, 2 by means of a cross rod 13.

It was previously stated that the trucks C, C were stationary and that they were disposed at one end of the trackways indicated at A and B. Each trackway consists of two rails, such as indicated at 15 and 16. These rails are supported and they form a support for a pair of movable carriages generally indicated at E, E. These carriages are best illustrated in Figs. 3 and 4, and as they are identical in construction the description of one will suffice. The carriage shown in Figs. 3 and 4 consists of a pair of interspaced side plates 17, 17 at the opposite ends of which are mounted shafts 18, 18. Journalled on these shafts exterior of the side plates are flanged wheels 19, and these wheels engage the trackway and form a support whereby the carriages E may be moved from end to end in the trackways, as will hereinafter be described.

Secured between the side plates 17, 17 are bolts 20, 20 and journalled thereon are rollers 21 and 22. Secured at one end of the roller 21 is a spur gear 21a and similarly secured at one end of the roller 22 is a spur gear 22a. Extending crosswise between the side plate 17, 17 are three shafts such as indicated at 23, 23 and 24. Secured on the shaft 24 is a spur pinion 25 and secured on the shafts 23 are intermediate spur gears 26, 26 which mesh with the pinion 25 and the gears 21a and 22a. The shaft 24 is extended through one of the side plates 17 in a manner similar to the shaft 7 and its outer end is squared, as indicated at 9a to receive the testing lever indicated at D in Fig. 5.

The testing lever forms the subject matter of applicant's copending application entitled "Brake testing lever", filed No. 19, 1928, Ser. No. 320,296 resulting in Patent No. 1,809,087, granted June 9, 1931, and as it is there fully described, only a brief reference to the testing lever will be made in this application. The lever is shown in Fig. 5 and its lower end is provided with a hub 30 in which is formed a square opening 31 to receive the squared ends of the shafts 9 and 9a. The lever is provided with an instrument somewhat similar to a pressure gauge such as shown at 32 and when the lever is applied, for instance to the shaft 9 and the shaft is rotated thereby, the resistance of the brakes against the brake drums will be visibly indicated by the hand 33 moving over the dial on the gauge, and it is thus possible to adjust each brake until a uniform application is secured.

In actual operation when an automobile is to be tested by the equipment here illustrated, the two movable trucks E, E are moved along the trackways until they abut the ends of the stationary trucks C, C, as indicated by dotted lines at E', see Fig. 4. At that end of the trackways a small recess is formed in each rail, as indicated at 40. The wheels 19a of the movable trucks drop into these recesses and the recesses merely serve the function of temporarily securing the movable trucks against movement when the automobile is running up onto the trucks. That is, as the automobile is driven forwardly, the front wheels first run up the inclined aprons 12 and over the rolls 4a and 5a. The front wheels then pass over the first roller 21 of the movable trucks and then settle down between the rollers 21 and 22. When the front wheels first strike the rollers 21 the entire weight of the front end of the automobile is exerted downwardly on the rollers 21 and on the wheels 19a of the movable trucks. The pressure applied at this point retains the wheels 19a in the recess 40, and thus secures the movable trucks against forward movement. The moment however that the front wheels engage the second set of rolls indicated at 22, the weight of the front end of the automobile is transferred to the center of the movable trucks and furthermore, a forward pressure will be exerted on the rolls 22. This pressure overcomes the downward pressure on the wheels 19a with relation to the recesses 40 and the front trucks will thus move ahead with the front wheels until they assume the position shown in Fig. 1, the rear wheels at the same time running up the aprons 12 and settling down between the rolls 4a and 5a of the stationary trucks. The moment the rear wheels settle down the automobile is in position and the brakes are then ready for adjustment and testing.

This is accomplished by applying a predetermined pressure to all of the brakes as described in a second application filed by Harry H. Patton, entitled "Method and apparatus for testing vehicle brakes" filed April 9, 1928, Serial No. 268,398 resulting in Patent No. 1,825,539, granted Sept. 2, 1931. The mechanism there disclosed consists of a screw jack which is interposed between the brake pedal and the front seat, the screw jack carrying a gauge which is actuated in a manner similar to the gauge indicated at 32 on Fig. 5. That is, it indicates the amount of pressure applied to the brake pedal and the brakes and as such permits a predetermined pressure to be applied to the brakes. After this pressure has been applied, the mechanic can adjust the brakes, and when they are adjusted he tests each brake by applying the lever D and rotating the rollers 4a and 5a, or 21 and 22, as the case may be. If he finds that the resistance against turning movement is not equal in all wheels, he continues to adjust until they are equal, and when equal pressure is indicated on all brakes, the work of adjustment and testing is completed. The automobile is then removed from the testing equipment in the following manner.

By referring to Figs. 3 and 4 it will be noted that a small pawl 50 is pivotally attached to one of the side plates, as at 51. This pawl is dropped into engagement with the gear 4b and thus locks the several gears and the rollers 4a and 5a against rotation, it being understood that there is one pawl 50 on each stationary truck so that both sets of rolls on the rear trucks are locked. The gear shift in the automobile is set for reverse and the car is then backed off the testing trucks by applying power. The rear rollers 4a and 5a being locked permit the rear wheels to ride off the rolls and down the incline of the aprons 12, and while the machine is so backing off the movable trucks run along the trackways until they abut the stationary trucks where the wheels 19 drop into the recesses 40. The front wheels will then ride off the rollers 21, and ride over the rollers 5a and 4a and down the inclined aprons 12, and the automobile is thus driven off the stand. The pawls 50 are then swung about their pivots 51 to release the gears 4b as the rollers 4a and 5a need not be locked against rotation when an automobile is being driven up on the trucks.

The amount of elevation often depends upon how high the stationary trucks C. C and the trackways A and B are arranged, the aprons 12 being lengthened or shortened as the elevation is increased or decreased. Practically any elevation desired may thus be obtained and if it is desired to only slightly elevate the automobile when on the testing stand, the trackways and the trucks are placed directly on the floor, as illustrated in Fig. 1. The testing equipment is exceedingly simple and easy to install. It forms an elevated support for the automobile to be tested, it provides free access for the mechanic who is doing the adjusting and it provides simple means for rotating each wheel as the respective brakes are being adjusted and tested.

While certain features of the present invention are more or less specifically described, I wish it understood that various changes may be resorted to within the scope of the appended claims, similarly, that the materials and finishes of the several parts employed may be such as the manufacturer may decide, or varying conditions or uses may demand.

Having thus described my invention, what I claim and desire to secure by Letters Patent is:—

1. A brake testing apparatus comprising a pair of trackways, a pair of stationary trucks at one end thereof, one for each trackway, a pair of movable trucks one for each trackway, said trucks having wheels engaging the trackways and permitting movement of the trucks from end to end of the trackways said trackways having an irregular portion at one end thereof engageable with wheels of the movable trucks to temporarily maintain the trucks motionless on the trackways.

2. A brake testing apparatus comprising a pair of trackways, a pair of stationary trucks at one end thereof, one for each trackway, a pair of movable trucks one for each trackway, said trucks having wheels engaging the trackways and permitting movement of the trucks from end to end of the trackways, said trackways having recesses formed at one end into which wheels of the trucks drop, said recesses temporarily securing the movable trucks against movement along the trackways.

3. A brake testing apparatus comprising a pair of trackways, a pair of stationary trucks at one end thereof, one for each trackway, a pair of movable trucks one for each trackway, said trucks having wheels engaging the trackways and permitting movement of the trucks from end to end of the trackways, said trackways having recesses formed at one end into which wheels at one end of the trucks drop, said recesses securing the movable trucks against movement along the trackways when weight is applied at said end of the movable trucks, said recesses releasing the wheels and permitting movement of the trucks along the trackways when weight is applied centrally and forwardly of the trucks and in a forward direction.

4. A brake testing apparatus comprising a pair of trackways, a pair of stationary trucks at one end thereof, one for each trackway, a pair of movable trucks one for each trackway, said movable trucks having wheels engaging the trackways and permitting movement of the trucks from end to end of the trackways, said trackways having recesses formed at one end with which one pair of wheels of each truck is engageable, said recesses securing the movable trucks against movement along the trackways when weight is applied over said pair of wheels of the movable trucks, said recesses releasing the wheels and permitting movement of the trucks along the trackways when weight is applied in a forward direction and toward the other wheels of the trucks.

5. A device of the character described comprising a trackway, a stationary truck at one end thereof, a movable truck having wheels at each end for engagement with the trackway and supporting a roller adjacent each end, there being recesses in the trackway adjacent the stationary truck for the reception of wheels at one end of the movable truck whereby a vehicle wheel rolling over the stationary truck will first engage the roller over said recesses and hold the movable truck stationary and then engage the other roller and push the movable truck along the trackway.

WILLIS H. WATROUS.